March 21, 1967 S. T. CARTER 3,310,449
LABELING MACHINE WITH YIELDABLE DRIVE MEANS
FOR PICKER AND EMERGENCY STOP
Original Filed May 20, 1963 6 Sheets-Sheet 1

INVENTOR.
SIDNEY T. CARTER
BY
ATT'YS

INVENTOR.
SIDNEY T. CARTER
BY
ATT'YS

March 21, 1967  S. T. CARTER  3,310,449
LABELING MACHINE WITH YIELDABLE DRIVE MEANS
FOR PICKER AND EMERGENCY STOP
Original Filed May 20, 1963  6 Sheets-Sheet 3

INVENTOR.
SIDNEY T. CARTER
BY
ATT'YS

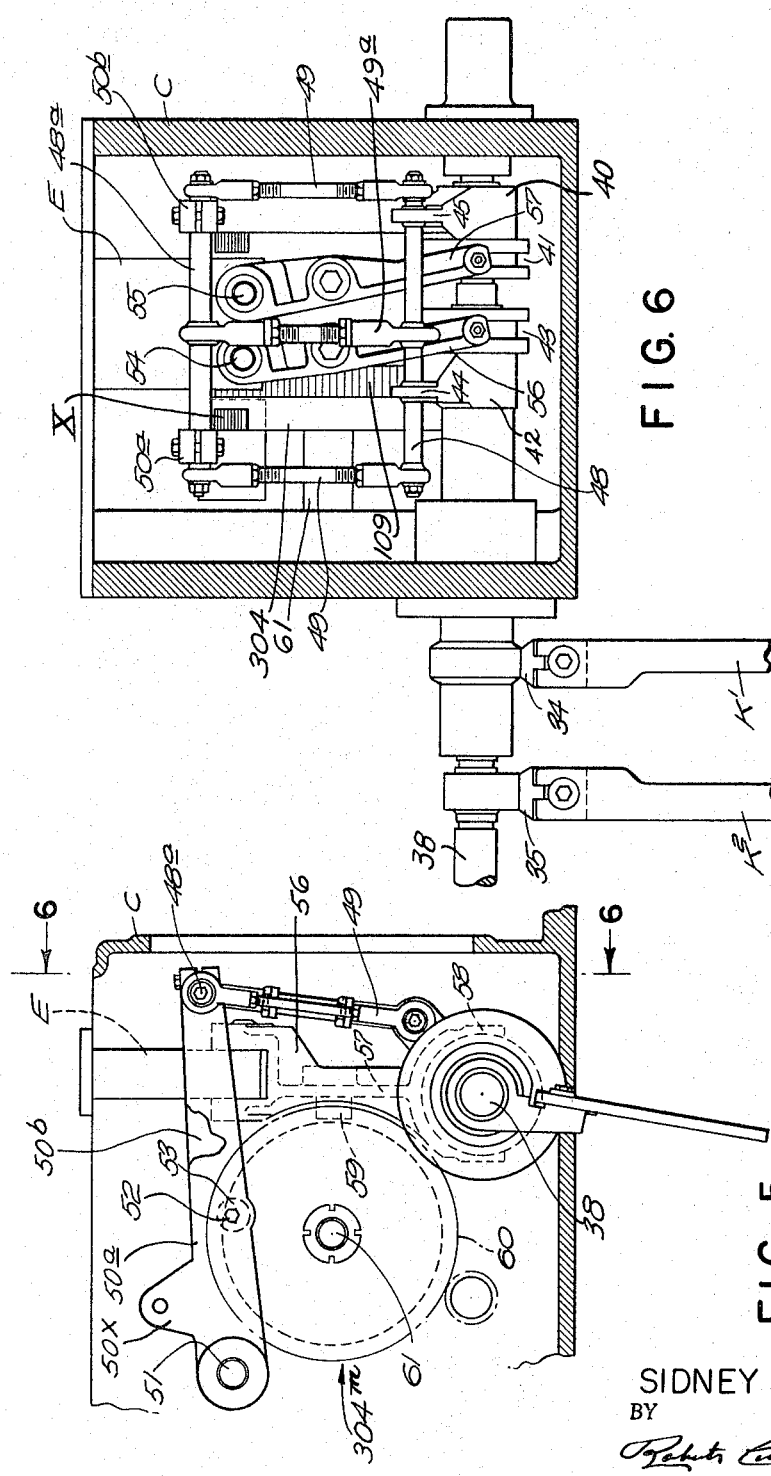

March 21, 1967  S. T. CARTER  3,310,449
LABELING MACHINE WITH YIELDABLE DRIVE MEANS
FOR PICKER AND EMERGENCY STOP
Original Filed May 20, 1963  6 Sheets-Sheet 5

INVENTOR
SIDNEY T. CARTER
BY
ATTORNEYS

March 21, 1967 S. T. CARTER 3,310,449
LABELING MACHINE WITH YIELDABLE DRIVE MEANS
FOR PICKER AND EMERGENCY STOP
Original Filed May 20, 1963 6 Sheets-Sheet 6
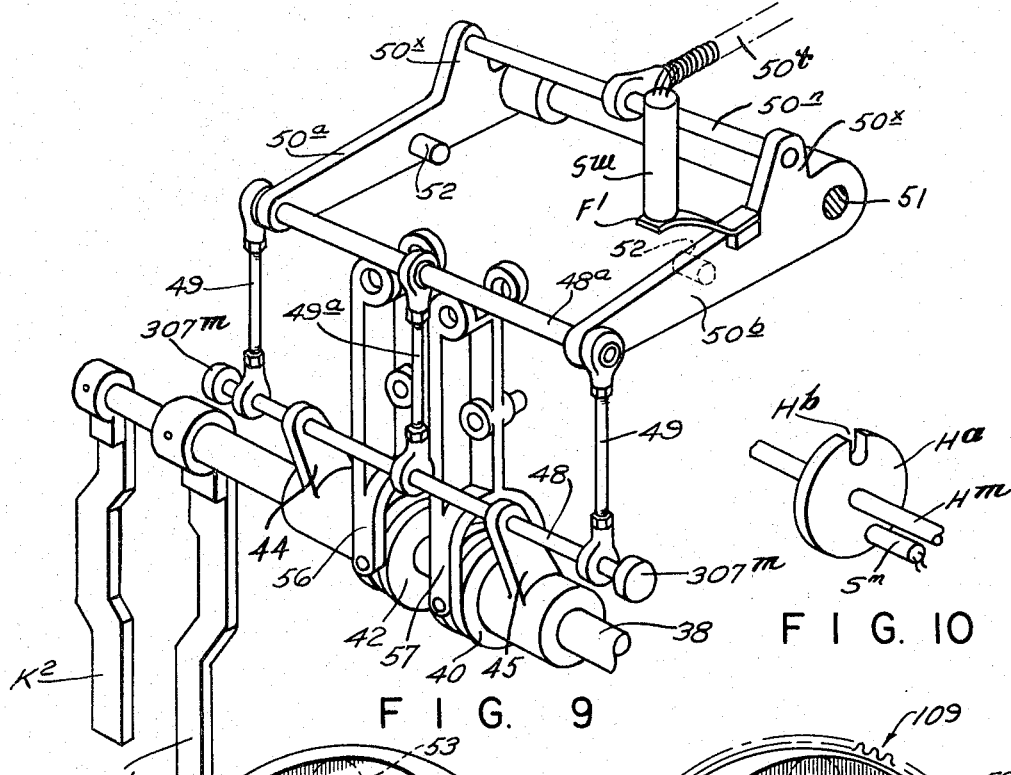
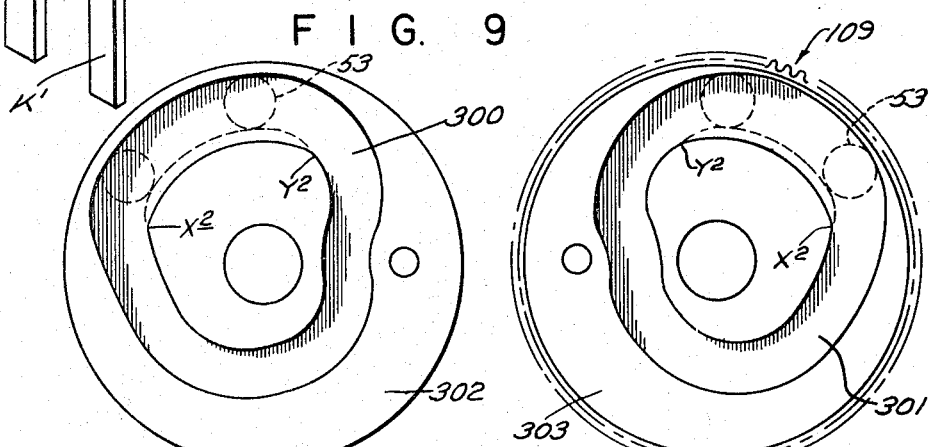
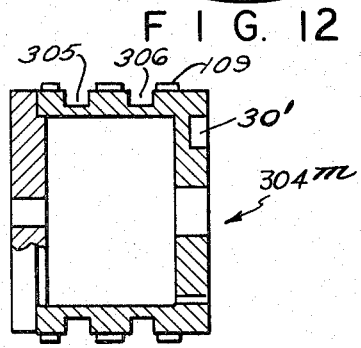
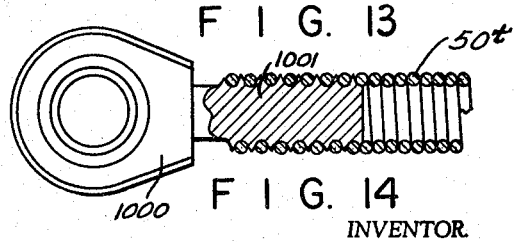
INVENTOR.
SIDNEY T. CARTER
BY
ATT'YS United States Patent Office 3,310,449
Patented Mar. 21, 1967

3,310,449
LABELING MACHINE WITH YIELDABLE DRIVE MEANS FOR PICKER AND EMERGENCY STOP
Sidney T. Carter, Shrewsbury, Mass., assignor to Geo. J. Meyer Manufacturing Co., Cudahy, Wis., a corporation of Wisconsin
Original application May 20, 1963, Ser. No. 281,624. Divided and this application Oct. 21, 1965, Ser. No. 499,762
7 Claims. (Cl. 156—365)

This invention relates to label-applying apparatus of that type wherein an oscillatory picker receives gum from a gum-supply, takes a label from the magazine and carries the label to an affixing position where the gum-coated surface of the label is held in the path of an approaching bottle which is to be labeled, and relates more especially to means operative to stop the machine automatically in the event that a misplaced bottle approaches the label-affixing point, the present application being a division of application for Letters Patent of the United States, Ser. No. 281,624, filed May 20, 1963, by Sidney T. Carter for Apparatus for Applying Gum to a Label Picker.

The object of the invention is to provide simple and effective means for stopping the labeling machine in the event that the normal movement of the picker, as it approaches the label-affixing point, is interfered with by a misplaced or broken bottle, thereby to prevent injury to the mechanism.

Other and further objects and advantages of the invention will be pointed out in the following more detailed description and by reference to the accompanying drawings wherein:

FIG. 1 is a fragmentary, perspective view (omitting the label magazine and certain other parts), showing the gum-applying apparatus of the present invention as embodied in a rotary or turret-type labeling machine, the two gum-applying or transfer rolls being shown at a time at which they are both closely adjacent to but spaced from the gum-supply or presenting roll, while the picker, having taken a label (not shown) from the magazine, is on its way to the transfer position;

FIG. 2 is a fragmentary front elevation, partly in perspective, of the apparatus shown in FIG. 1, showing the part at a different point in the cycle, one of the gum-applying or transfer rolls being in contact with the gum-supply roll, while the other roll, having received gum, has moved toward the position at which it will soon be contacted by the picker to apply gum to the latter, the picker now being at the transfer position;

FIG. 5 is a fragmentary, vertical section through the casing which houses the mechanism for actuating the gum-transfer rolls and picker, the picker shaft being shown in end elevation with the picker at the lowest point of its travel;

FIG. 6 is a section through the same casing, showing the means for moving the picker blades laterally, the section being substantially on the line 6—6 of FIG. 5;

Figure 7:
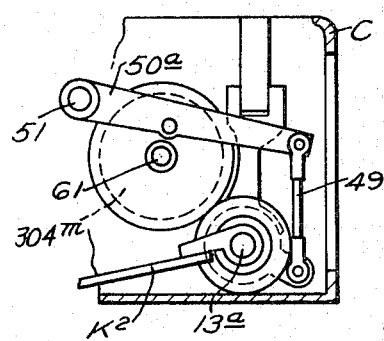
FIGS. 7 and 7a are views similar to FIGS. 5 and 6, respectively, but showing the picker blades at the highest point in their path of travel, that is to say, in label-picking position and as having moved forwardly with reference to the center line of a bottle disposed in label-receiving position.
Figure 7A:
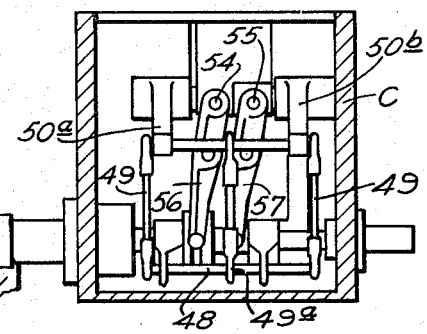
Figure 8:
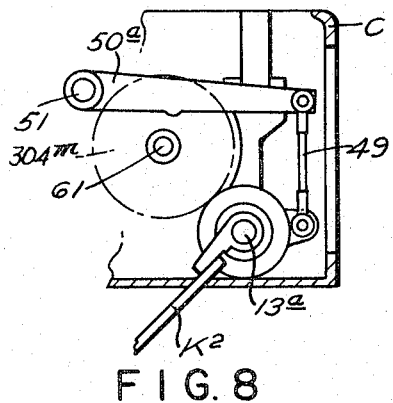
Figure 8A:
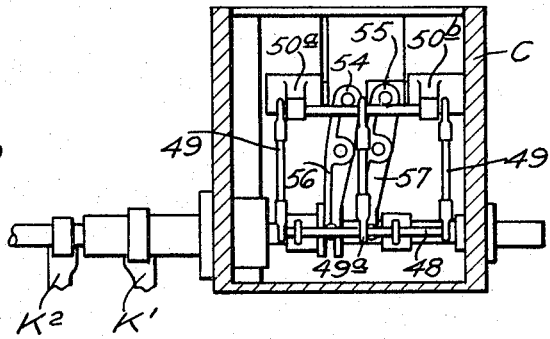

FIGS. 8 and 8a are views similar to FIGS. 5 and 6, respectively, but showing the pickers on their way down toward label-applying position, but still located forwardly as in FIGS. 7 and 7a;

FIG. 9 is a fragmentary perspective view showing a part of the picker-actuating mechanism as it appears when the pickers are located at label-applying position, and illustrating a safety device operative to prevent breakage of parts as the result of a displaced bottle;

FIG. 10 is a perspective view showing a switch-actuating cam forming a part of the safety mechanism;

FIG. 11 is a diametrical section through the barrel cam which moves the picker blades laterally and toward and from each other;

FIGS. 12 and 13 are elevations of the two cams which act simultaneously to rock the pickers up and down, these cams being located at opposite ends, respectively, of the barrel cam shown in FIG. 11; and FIG. 14 is a fragmentary view, showing one end of the picker control spring.

Figure 1:
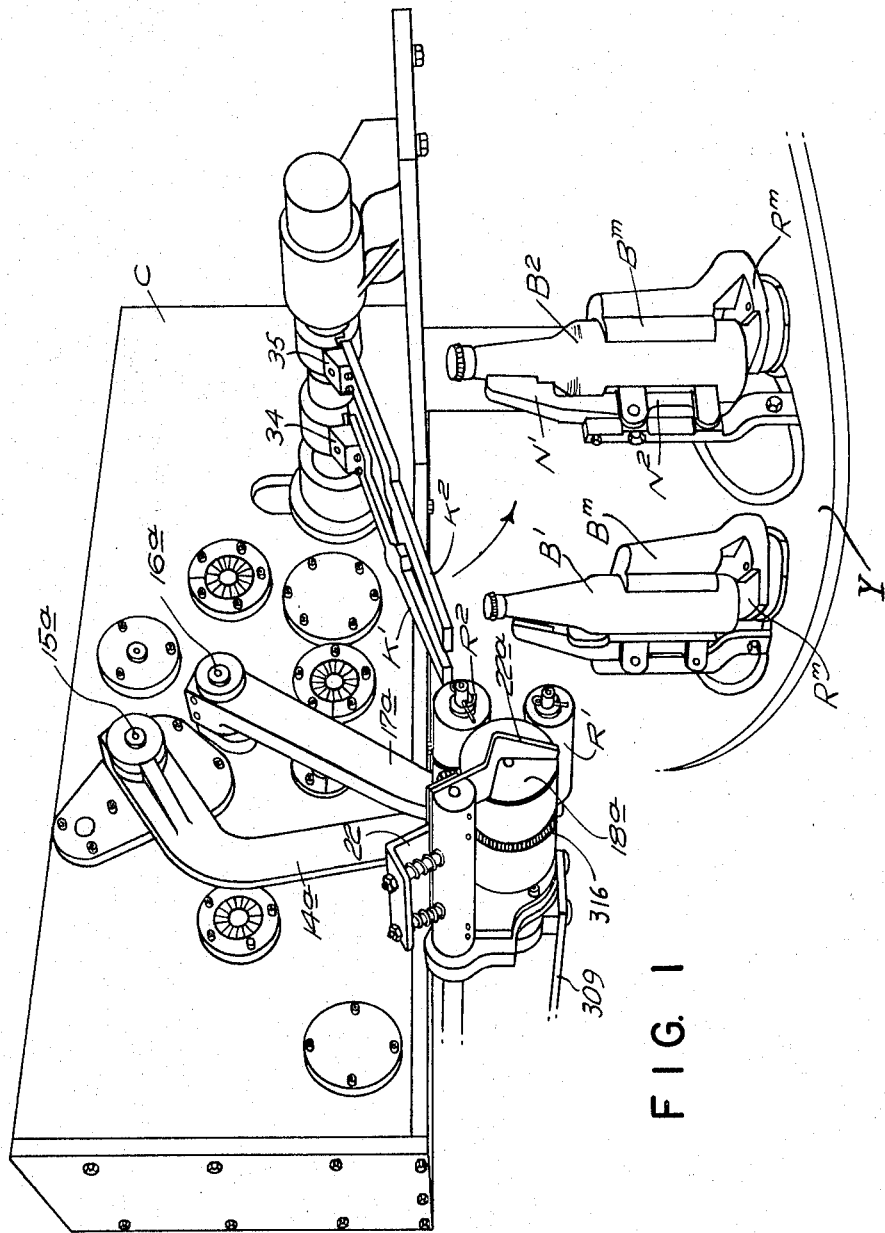
Figure 2:
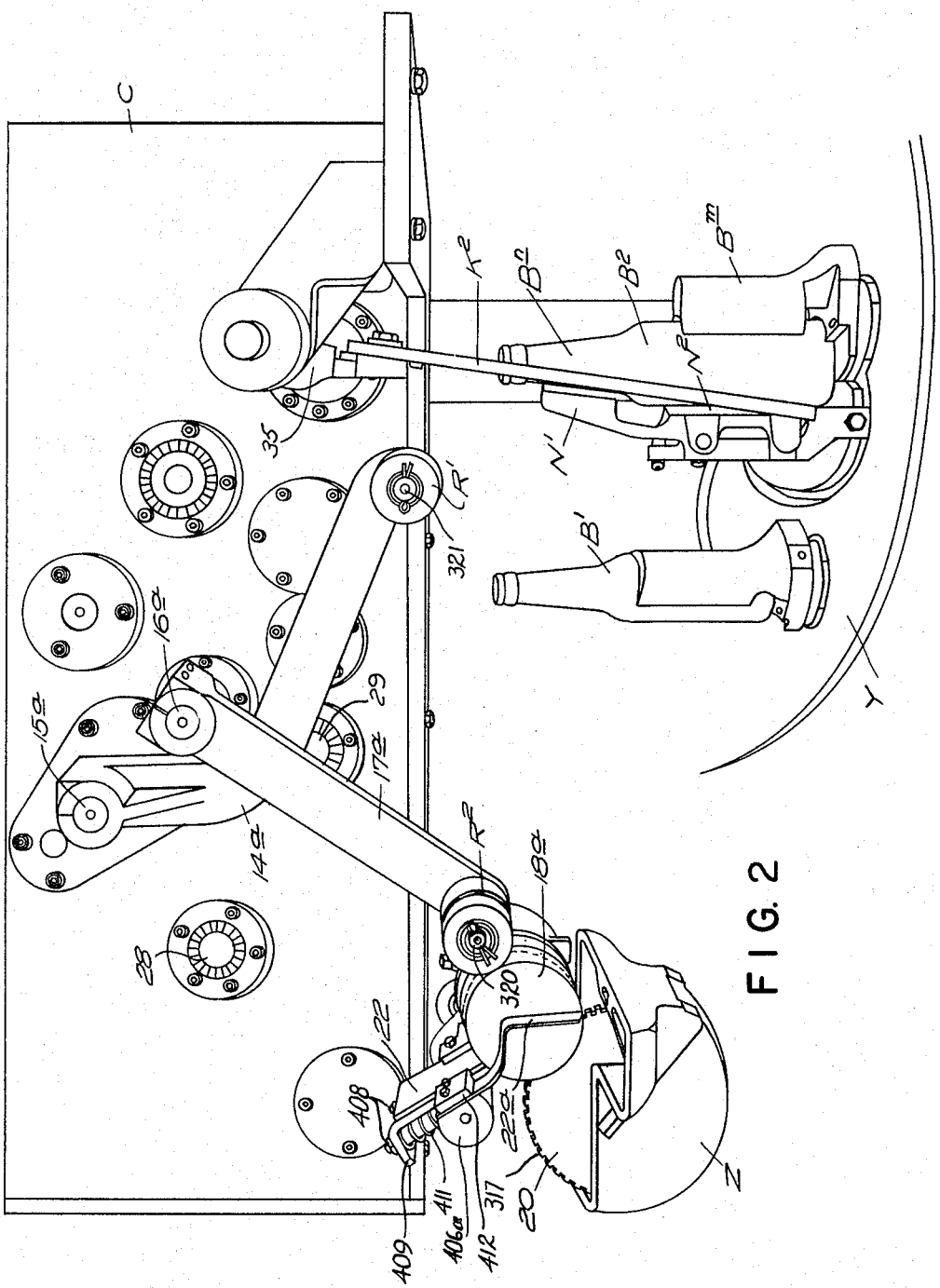

The apparatus of the present invention includes a gum box Z (FIG. 2) for holding liquid gum, having therein a gum-elevating roll 20 which picks up gum from the box and applies it to the peripheral surface of a constantly rotating gum-supply or presenting roll 18a (FIGS. 1 and 2). From the roll 18a gum is taken by two independent rotary transfer rolls $R^1$ and $R^2$ (FIGS. 1 and 2), one of which receives gum from the roll 18a and applies it to the picker during one picker cycle, while the other transfer roll takes gum from the supply or presenting roll 18a and applies it to the picker during the following cycle, the means for actuating the picker and the two transfer rolls being so devised that one transfer roll may be receiving gum from the elevating roll, while the other transfer roll is applying gum to the picker, and vice versa.

While of broader utility, the label-picking and gum-applying mechanism of the present invention is here illustrated and described with particular reference to its application to a labeling machine of the rotary type.

Figure 3:
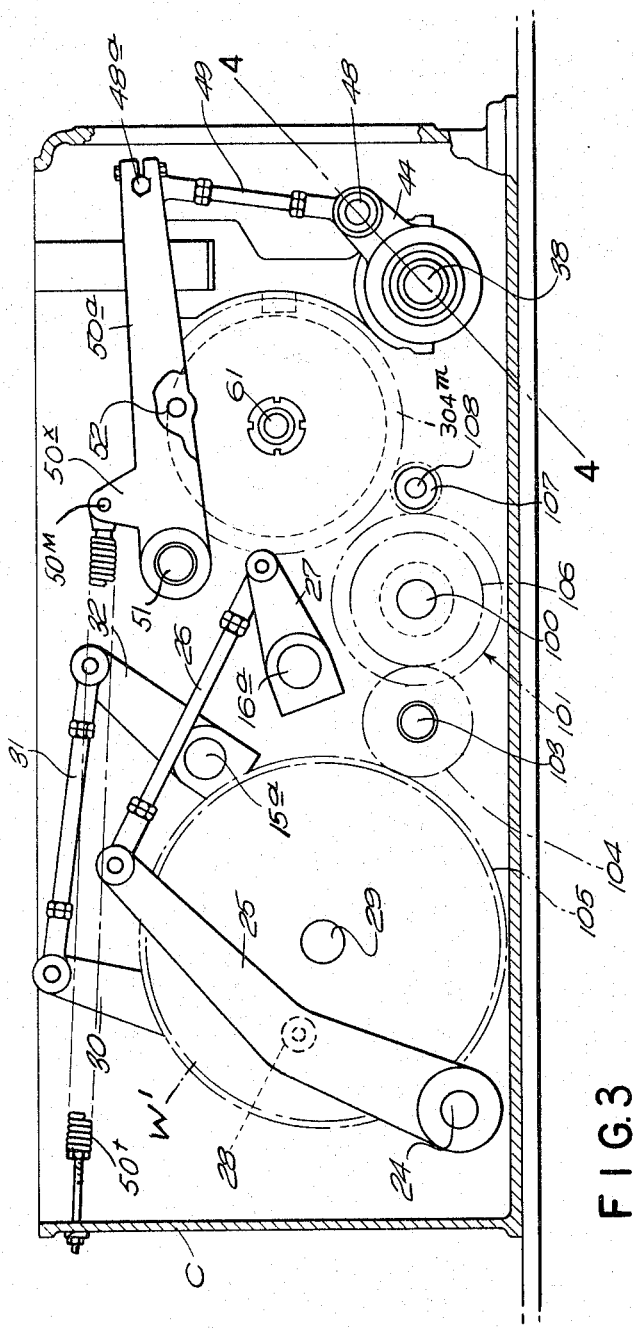
FIG. 3 is a vertical, longitudinal section through the casing or housing for the gears and cams which actuate the gum-transfer rolls and picker, with some parts broken away, and showing the several shafts in end elevation and diagrammatically indicating the locations of some of the cams.

Referring to FIG. 2, there is diagrammatically shown, in side elevation, a casing or housing C for the gears and actuating cams for the gum-transfer rolls and picker. This casing supports bearings for the several shafts involved in driving the operative parts. Thus, the gum-transfer rolls $R^1$ and $R^2$ are here shown as carried, respectively, by a long lever arm 14a and a relatively shorter lever arm 17a, these arms being fixed to rock shafts 15a and 16a respectively. The gum-supply roll is diagrammatically indicated at 18a; and one end of the picker shaft appears at 38 (FIG. 3). The centers of certain other shafts are indicated at $C^1$, $C^2$, $C^3$, $C^4$, $C^5$ and $C^6$, respectively.

In FIG. 1 the casing or housing C is shown, merely by way of example, as associated with a labeling machine of the rotary or turret type above referred to, comprising the horizontal table Y which is turned by mechanism (not here illustrated), and upon which is mounted a series of bottle carriers Rm, each having a bottle-steadying bracket Bm which holds the bottle in upright position and prevents it from tipping in response to the pressure of the label-pressing pad. Associated with each holder there is a grip-finger device comprising, as here shown, upper and lower parts $N^1$ and $N^2$ designed, respectively, to press the neck and body labels, delivered by the picker, against the bottle.

The picker is of the separable blade type comprising the blades $K^1$ and $K^2$ which, when separated, hold the label by its ends so that the label extends transversely of the bottle path and is thus contacted by the moving bottle.

Figure 4:
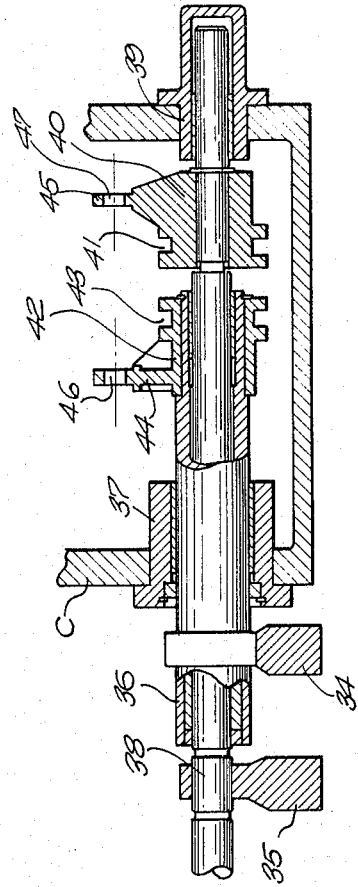
FIG. 4 is a fragmentary section, to larger scale, on the line 4—4 of FIG. 3.

The two picker blades $K^1$ and $K^2$ (FIGS. 1 and 9), respectively, are secured to parts 34 and 35 (FIGS. 4 and 6), the part 34, which carries picker blade K¹ being fixed to a tubular shaft 36 (FIG. 4), one end of which is mounted to turn in a bearing 37 fixed in an opening in the wall of the housing or casing C, while the part 35, which carries the picker blade K², is fixed to a solid shaft 38, part of which telescopes within the tubular shaft 36 and whose opposite end (remote from the part 35) is arranged to turn and slide in a bearing 39 (FIG. 4) mounted in an opening in the wall of the casing.

A sleeve 40 (FIG. 4), having a peripheral groove 41 and a radial arm 45, is so fixed to the shaft 38 that axial motion of the sleeve produces corresponding axial motion to the shaft, while rotational movement of the sleeve 40, about the axis of the shaft, causes the shaft to rock. A sleeve 42 of generally corresponding type is fixed to the tubular shaft 36, this sleeve 42 having the peripheral groove 43 and the radial arm 44. The arms 44 and 45 of the two sleeves have aligned holes 46 and 47 (FIG. 4) in which are secured antifriction bearings which receive an elongate rigid rod 48 (FIGS. 3, 6, 7a, 8 and 9) to whose opposite ends are pivotally attached the lower ends of rigid links 49 (FIGS. 3, 6, 7a, 8a and 9), whose upper ends are pivotally connected to an elongate rigid rod 48a. The rod 48a turns in spaced bearings fixed in the free ends of levers 50a and 50b (FIG. 5) which rock about the axis of a supporting shaft 51 (FIGS. 3, 5 and 9). A third rigid link 49a (FIG. 9) is pivotally connected at its upper and lower ends, respectively, to the rods 48a and 48. Each of the levers 50a and 50b is provided, intermediate its ends, with a stub shaft 52 on which there is mounted a cam follower roll 53 (FIGS. 5, 12 and 13), these cam follower rolls engaging cam grooves 300 and 301, respectively, in cams 302 and 303 (FIGS. 12 and 13) at the opposite ends of a barrel cam 304m (FIG. 11), having peripheral grooves 305 and 306 and which is fixed to the shaft 61, said barrel cam having peripheral teeth constituting a gear 109.

By means of the above-described mechanism, the picker blades K¹ and K² are rocked in properly timed relation to the other parts of the machine. Desirably, the rod 48 (FIG. 6) is provided at each end, respectively, with restraining means, for example a shoe 307m (FIG. 9) which slides in contact with a flat vertical surface (not here illustrated) of the machine frame thereby to prevent rod 48 from moving endwise, although permitting it to move freely up and down.

Each of the lever arms 50a and 50b has an upstanding lug 50x (FIGS. 5 and 9) near its pivoted end. A rigid rod 50a, connecting these lugs, provides anchorage for one end of a long tension spring 50t (FIGS. 3 and 9), whose other end (FIG. 3) is anchored to the wall of the housing C. One desirable means for attaching the end of such a spring to another part, for example the rod 50m, is by providing an anchor member for the end of the spring such, for example, as the part 1000 (FIG. 14), having a shank 1001 provided with a screw thread of a special configuration adapted to make screw-threaded engagement with the spires of the spring, thus providing a secure connection without creating force causing transverse deflection of the spring.

The spring 50t, as thus arranged, tends to hold the levers 50a and 50b upwardly and thus to swing the picker blades downwardly toward the label-applying position.

A fixed support E (FIG. 5), forming a part of the casing C, carries parallel stub shafts 54 and 55 (FIG. 6) on which are mounted lever arms 56 and 57, respectively, each of these lever arms having a forked lower end 58 (shown in dotted lines in FIG. 5), which is received in one of the grooves 41 or 43, respectively, in the sleeves 40 and 42 (FIG. 4) above described. Each of these lever arms 56 and 57 is provided with a cam follower roll 59 (such as is indicated in FIG. 5), for engagement with one of the grooves 305, 306 (FIG. 11), respectively, in the periphery of the barrel cam 304m, which is mounted on the shaft 61. As this barrel cam rotates, the lever arms 56 and 57 are so moved as to cause the sleeves 40 and 42 to move relatively to each other in a direction parallel to the axis of the shaft 38.

The cam grooves 305 and 306 in the barrel cam 304m (FIG. 11) are so contoured that when the picker is taking a label from the magazine, the proximate edges of picker blades K¹ and K² are at their nearest point of approach.

As the picker reaches the label-applying or affixing position, the blades K¹ and K² are caused, by the grooves of the barrel cam, to move apart so as to permit the bottle to pass between them, the blades remaining in this relative position as the picker starts to move upwardly toward the magazine.

In order to avoid the possibility of injury to the parts of the machine, if, for example, a bottle should tip in passing from the usual feeder star wheel (not here shown) to the bottle carrier Rm and thus interfere with the normal downward motion of the picker, the groove of each of the picker-actuating cams 302 and 303 (FIGS. 12 and 13) is provided with an abnormally wide portion between the points X² and Y², thus permitting the cam follower roll which, by the action of spring 50t, normally follows the outer wall of the cam groove (when moving along this clearance portion of the groove), to move radially inward in response to unusual force, so that the picker will not be destructively forced downwardly in attempting to reach the normal label-transfer position.

As a further measure of safety, one of the levers (for example, the lever 50b, FIG. 9), by means of which the pickers are rocked, is provided with a resilient metal contact finger F¹ which is normally in operative relation to a proximity switch Sw, while the cam follower roll is normally moving between the points X² and Y² in contact with the outer contour of the cam, this switch Sw being in parallel with a second proximity switch Sm (FIG. 10) in the drive circuit of the machine. So long as the pickers are free to move downwardly to their normal extent, the circuit will be closed at the switch Sw during the arc X² and Y² of rotation of the cams 302 and 303.

Referring to FIG. 10, there is shown a disc Ha which is mounted on a shaft Hm turning in time with the main shaft of the machine, in such a way that each time the contact finger F¹ (FIG. 9) rises into operative relation to the switch Sw, a slot or recess Hb in the disc Ha registers with the second proximity switch Sm, above referred to, so as to open the latter switch. However, since the switch Sm is thus open only once in each revolution of the shaft Hm, during that part of the cycle corresponding to the arc X² and Y², just referred to, the stop circuit of the machine is not broken unless, at the same time, the switch Sw is open by failure of the contact finger F¹ to rise, since the two switches are in parallel. Normally, assuming that the picker is free to move downwardly to its lowest extent during each cycle, the concomitant rise of the contact finger F¹ into circuit-closing relation to the switch Sw will keep the circuit from being open and the machine will continue to run. However, it will be understood that if there is any interference in the downward motion of the pickers due to a misplaced bottle, so that the levers 50a and 50b cannot travel to their full height and in consequence the circuit is opened at the switch Sw, the machine will be automatically stopped when the recess Hb in the disc registers with switch Sm thus avoiding damage.

While one desirable embodiment of the invention has herein been disclosed by way of example, it is to be understood that the invention is broadly inclusive of any and all modifications falling within the terms of the appended claims.

I claim:

1. In combination, in a labeling machine, a magazine for labels, a picker, and means normally operative to move the picker cycle-after-cycle between the magazine and a label delivery point, characterized in that the means for moving the picker comprises a power-driven element, and a yieldable device which normally constrains the picker, during each cycle of operation, to advance toward the label delivery point but which yields, if the picker encounter an obstruction in moving toward the label delivery point, to allow the picker to stop before any part of the machine suffers injury.

2. In combination, in a labeling machine, a magazine for labels, a picker, and means normally operative to move the picker cycle-after-cycle between the magazine and a label delivery point, characterized in that the means for moving the picker comprises a cam having therein a groove of 360° arcuate extent, and a follower roll within the groove, the groove substantially equalling the diameter of the roll throughout the major portion of its extent but having a recess in its inner wall of approximately 90° arcuate extent located at that portion of the groove which is occupied by the roll as the picker nears the label-affixing point, and a yieldable device which normally constrains the roll to follow the outer wall of the groove during each cycle of operation but which permits the roll to move into the recess if the picker encounter an obstruction as it approaches the label-affixing point thereby to permit the advance of the picker toward the label-affixing point to cease before any part of the machine suffer injury, and means operative automatically to stop the motor if the follower roll enter said recess.

3. In combination, in a labeling machine, a magazine for labels, a picker, a motor which normally moves the picker, cycle-after-cycle, between the magazine and a label delivery point, a circuit for the drive motor having therein a normally closed switch, and means whereby, if, as it moves toward the label delivery point, the picker is stopped by an obstruction, the switch is actuated to break the motor circuit.

4. In a machine of the class described wherein a main shaft is driven by an electric motor and wherein a picker is advanced cyclically toward a label-affixing point by a rocking lever, in combination, means including a cam, for rocking the lever in a direction to advance the picker toward the affixing point, the cam having a groove defined by spaced walls and being of 360° in arcuate extent, a follower roll in said groove, a spring which normally holds the follower roll in operative contact with one of the walls of the groove, the opposite wall of the groove having a recess into which the roll may retreat, in opposition to the spring force, if the motion of the picker-actuating lever is obstructed as the picker nears the label-affixing point, and emergency means for breaking the supply circuit of the motor, said emergency means comprising two switches, connected in parallel into said circuit, and means normally operative, as the picker nears the affixing point, to keep the circuit closed at one, at least of said switches but including, in combination, means whereby, if the picker-actuating lever fail to reach the normal limit of its travel by reason of obstruction to the advance of the picker, the circuit will be broken at both of said switches thereby stopping the machine.

5. Apparatus according to claim 4, wherein the emergency means for stopping the motor comprises a resilient contact finger carried by one of the levers which advances the picker toward the transfer point, and which comes into operative relation to one of said switches when the lever approaches that limit of its motion which corresponds to the near approach of the picker to the transfer position.

6. In a machine of the class described wherein a main shaft is driven by an electric motor and wherein a picker is advanced cyclically toward a label-affixing point by a rocking lever, in combination, means for rocking the lever in a direction to advance the picker toward the affixing point, said means for rocking the lever being such that, if the advance of the picker be obstructed, the lever may stop short of the terminus of its normal arc of motion, emergency means for breaking the supply circuit of the motor, said emergency means comprising switch means in said circuit, a contact finger carried by said lever which is normally operative, as the picker nears the affixing point, to keep the circuit closed at said switch means, and means whereby, if the picker-actuating lever fail to reach the normal limit of its travel by reason of obstruction to the advance of the picker, the circuit will be broken at said switch means, thereby stopping the motor, further characterized in that said switch means comprises two switches arranged in parallel in the motion-control circuit, and a part rotating in time with the main shaft which keeps the circuit closed at one of said switches except during a predetermined portion of the labeling cycle, the parts being so arranged that the motor circuit will remain closed, except at such times as the picker-advancing level fails to hold the contact finger in switch-closing relation to the other of said switches while the picker is near the label-affixing position.

7. In combination, in a labeling machine wherein a picker element is normally moved in an arcuate path of predetermined extent in carrying a label from a magazine to a transfer point, and means for actuating the picker comprising a power-driven face cam having a cam follower disposed in a groove in the face cam, and resilient means operative normally to hold the cam follower in contact with the outer wall of said groove, the groove being of such contour that, if the picker element is obstructed on its way toward the transfer point, the cam follower may leave the outer wall of the groove and thereby allow the picker to stop before it suffers injury.

References Cited by the Examiner

UNITED STATES PATENTS

| 740,816 | 10/1903 | Daily | 74—567 |
|---|---|---|---|
| 2,284,019 | 5/1942 | Powell | 156—491 |
| 3,192,093 | 6/1965 | Tobey | 156—352 |

FOREIGN PATENTS 520,260   4/1940   Great Britain.

EARL M. BERGERT, *Primary Examiner.*

J. P. MELOCHE, *Assistant Examiner.*